United States Patent
VandenBossche

(10) Patent No.: US 11,919,808 B2
(45) Date of Patent: Mar. 5, 2024

(54) METHOD FOR MANUFACTURING CEMENT FROM AN ALUMINOSILICATE RAW MATERIAL

(71) Applicant: COMMISSARIAT A L'ENERGIE ATOMIQUE ET AUX ENERGIES ALTERNATIVES, Paris (FR)

(72) Inventor: Martin VandenBossche, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 29 days.

(21) Appl. No.: 17/456,249

(22) Filed: Nov. 23, 2021

(65) Prior Publication Data
US 2022/0162120 A1 May 26, 2022

(30) Foreign Application Priority Data
Nov. 26, 2020 (FR) ..................................... 20 12164

(51) Int. Cl.
*C04B 12/00* (2006.01)
*C04B 7/24* (2006.01)
*C04B 28/00* (2006.01)

(52) U.S. Cl.
CPC .............. *C04B 12/005* (2013.01); *C04B 7/24* (2013.01); *C04B 28/006* (2013.01); *Y02P 40/10* (2015.11)

(58) Field of Classification Search
CPC ....... C04B 12/005; C04B 28/006; C04B 7/24; C04B 28/00; C04B 12/00; C04B 14/10; C04B 14/14; C04B 18/08; C04B 18/141; C04B 18/146; C04B 14/02; Y02P 40/10
See application file for complete search history.

(56) References Cited

FOREIGN PATENT DOCUMENTS

| CN | 108751821 A | * 11/2018 | ........... C04B 28/006 |
| CN | 108975780 A | * 12/2018 | |
| JP | 2020-186143 A | 11/2020 | |

OTHER PUBLICATIONS

Ogundiran et al. Geopolymerisation of fly ashes with waste aluminium anodizing etching solutions, Journal of Environmental Management, 181 (2016) 118-123. DOI: 10.1016/j.jenvman.2016.06.017. (Year: 2016).*
CN-108751821-A, machine translation (Year: 2018).*

(Continued)

*Primary Examiner* — Anthony J Green
*Assistant Examiner* — Marites A Guino-O Uzzle
(74) *Attorney, Agent, or Firm* — Oblon, McClelland, Maier & Neustadt, L.L.P.

(57) ABSTRACT

A method for manufacturing cement may include: supplying at least one etching effluent of a substrate based on silicon including a silicate of an alkali metal, M, having formula $SiO_2:M_2O$, and having a molar ratio $SiO_2/M_2O$ greater than or equal to 0.8; supplying an aluminosilicate raw material, and mixing the aluminosilicate raw material with the etching effluent having a molar ratio $SiO_2/M_2O$ greater than or equal to 0.8. The silicate solution of alkali metal may be recovered with an existing silicon industrial process, implementing a silicon etching. The environmental impact of the method of manufacturing cement may therefore be reduced.

17 Claims, 3 Drawing Sheets

(56) References Cited

OTHER PUBLICATIONS

CN-108975780-A, machine translation (Year: 2018).*
Ogundiran et al., "Geopolymerisation of Fly Ashes With Waste Aluminium Anodising Etching Solutions", Journal of Environmental Management vol. 181, Jun. 20, 2016, 6 pages.
Dias et al., "Effect of $Na_2O/SiO_2$ and $K_2O/SiO_2$ Mass Ratios on the Compressive Strength of Non-Silicate Metakaolin Geopolymeric Mortars", Materials Research Express 6 075514, 2019, 11 pages.
Rangan, "Geopolymer Concrete for Environmental Protection", The Indian Concrete Journal, vol. 88, Issue 4, Apr. 2014, 19 pages.
Dron et al., "Mécanisme de la Réaction Alcali-Silice", Bulletin des Laboratoires des Ponts et Chaussées—214 Ref. 4175, 1998, 9 pages.
Davidovits, "Ciments Géopolymères", Techniques de L'Ingénieur, Oct. 10, 2014, Ref. N3301 V1, 21 pages.
French Preliminary Search Report dated Aug. 13, 2021 in French Application 2012164 filed on Nov. 26, 2020 (with English Translation of Categories of Cited Documents & Written Opinion), 8 pages.

* cited by examiner

METHOD FOR MANUFACTURING CEMENT FROM AN ALUMINOSILICATE RAW MATERIAL

CROSS-REFERENCE TO RELATED APPLICATIONS

The present application is filed under the Paris Convention and claims the benefit of the filing date of French Appl. No. 2012164, filed on Nov. 26, 2020, the content of which is incorporated by reference herein.

TECHNICAL FIELD OF THE INVENTION

The present invention relates to the field of manufacturing cement. It has for particularly advantageous application the field of geopolymer cements.

PRIOR ART

There are several types of cement in use today, in particular as a binder for the manufacture of concrete. A commonly used cement is the "Portland" cement comprised of rocks with a $CaCO_3$, sand and clay base. Portland cement comes from a heavy and complex industry consisting of transforming the limestone and clay in ovens at 1500° C. in order to create clinker, the basic component of cement. The heat required for this transformation is generally generated by fossil energies. This results in a substantial release of carbon dioxide. Furthermore, the transformation of the limestone into calcium oxide induces a substantial release of carbon dioxide, having chemical formula $CO_2$. In these conditions, it is estimated that the production of one tonne of cement emits between 750 kg and 950 kg of $CO_2$.

There are so-called "geopolymer" or "alkali-activated" cements, manufactured from an aluminosilicate raw material, and from an alkali solution rich in dissolved silica. These cements differ chemically from Portland cement in that the hardening of the Portland cement is done via hydration of the tricalcium silicate of the clinker, while the setting of a geopolymer cement is done via polymerisation of oligo-(sialate-siloxo) of an alkali metal, typically potassium or sodium, in poly(sialate-siloxo) of this alkali metal. In the geopolymer cements, the transformation of the aluminosilicate raw material has an energy cost and a $CO_2$ discharge that are much less than those of the manufacture of Portland cement. From an economic and environmental standpoint, these cements are therefore promising as an alternative or as a mixture with Portland cement.

It is in particular known from the document Ciments géopolymères, J. Davidovitz, Techniques de l'Ingénieur, 10 Oct. 2014, a method for manufacturing cement comprising the mixing in water of an aluminosilicate raw material and of silicates of potassium or of sodium, having formula $SiO_2$:$M_2O$ (M here representing the sodium or the potassium) and having a molar ratio $SiO_2$/$M_2O$ comprised between 1.45 and 1.95. This method can still however be improved, in particular to decrease its environmental impact.

An object of the present invention is therefore to propose a solution that reduces the environmental impact of a method for manufacturing cement from aluminosilicate raw material.

The other objects, characteristics and advantages of the present invention shall appear when examining the following description and the accompanying drawings. It is understood that other advantages can be incorporated.

SUMMARY OF THE INVENTION

To reach this objective, according to a first aspect a method for manufacturing cement is provided comprising:
providing at least one etching effluent of a substrate based on silicon comprising a silicate of a dissolved alkali metal M, having formula $SiO_2$:$M_2O$, having a molar ratio $SiO_2$/$M_2O$ greater than or equal to 0.8, and preferably greater than or equal to 1.40,
providing an aluminosilicate raw material, and
mixing the aluminosilicate raw material with the etching effluent.

Thus, the silicate solution of alkali metal is recovered with an existing silicon industrial process, implementing a silicon etching and therefore an etching effluent of a substrate based on silicon. For example, this method can be a method for treating the substrate in the field of photovoltaics, for example for the manufacture of photovoltaic cells based on silicon, and in particular photovoltaic cells made from a monocrystalline silica substrate, or microelectronics, for example for the manufacture of a microelectronic component. It is therefore not necessary to manufacture the silicate solution of alkali metal for the reaction with the aluminosilicate raw material, contrary to the existing solutions. Instead of consuming resources to form this solution, the chemical waste from the silicon-based substrate etching industry is reinjected into this method for manufacturing cement for the updating thereof. The energy cost and the resources required for the manufacturing of the cement are reduced, and consequently the environmental impact of the method for manufacturing cement is reduced.

According to another aspect, the method for manufacturing cement can be implemented in a method for manufacturing concrete. The method for manufacturing concrete can comprise the manufacture of cement according to the first aspect and the mixing of the cement and of aggregates.

Another aspect of the invention relates to a use of an etching effluent of a substrate based on silicon, formed of a silicate solution of an alkali metal, having formula $SiO_2$:$M_2O$, and having a molar ratio $SiO_2$/$M_2O$ substantially greater than or equal to 0.8, and preferably substantially greater than or equal to 1.40, in a mixture with an aluminosilicate raw material, for the manufacture of cement. This aspect has the advantages described in relation to the first aspect.

According to an example, the substrate based on silicon of which the etching effluent is provided, is a substrate based on silicon forming or intended for forming a photovoltaic cell or a microelectronic component.

BRIEF DESCRIPTION OF THE FIGURES

The purposes, objects, as well as the characteristics and advantages of the invention shall appear better from the detailed description of an embodiment of the latter which is illustrated by the following accompanying drawings wherein.

Figure 1:
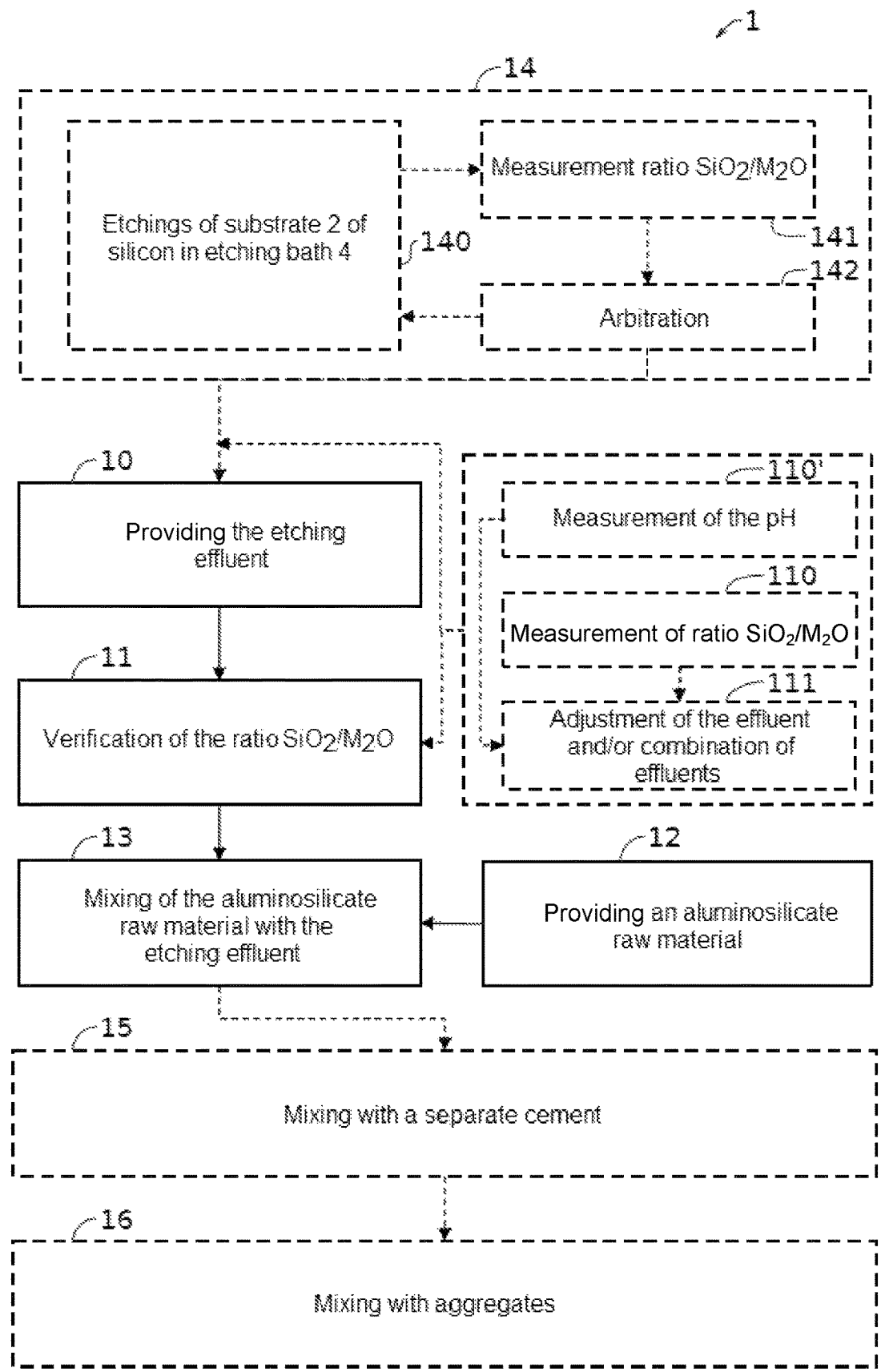
FIG. 1 shows steps of the method for manufacturing cement according to an embodiment, where optional steps of the method are indicated as a dotted line and paths in parallel indicate alternatives of the method.

The drawings are given as examples and do not limit the invention. They form schematic block representations intended for facilitating the understanding of the invention and are not necessarily to the scale of practical applications.

DETAILED DESCRIPTION OF THE INVENTION

Before beginning a detailed review of embodiments of the invention, optional characteristics that can possibly be used in combination or alternatively are mentioned hereinafter.

According to an example, the method comprises prior to the mixing of the aluminosilicate raw material with the etching effluent, a verification that the molar ratio $SiO_2/M_2O$ of the at least one etching effluent is greater than or equal to 0.8, and preferably greater than or equal to 1.40.

According to an example, the verification is carried out before or after providing the at least one etching effluent.

According to an example, the verification of the molar ratio $SiO_2/M_2O$ comprises a measurement of the molar ratio $SiO_2/M_2O$ in the at least one etching effluent. The measurement of the molar ratio $SiO_2/M_2O$ in the at least one etching effluent can be prior to providing the at least one etching effluent.

According to an example, the verification comprises, following the measurement of the molar ratio $SiO_2/M_2O$, a modification of the at least one etching effluent in such a way that the molar ratio $SiO_2/M_2O$ reaches a determined value. Thus, the effluent can be modified in such a way that the molar ratio $SiO_2/M_2O$ is greater than 0.8, preferably greater than 1.40, if it was not so beforehand. Alternatively or complementarily, the effluent can be modified in such a way that the molar ratio $SiO_2/M_2O$ has a predetermined value greater than 0.8, preferably greater than 1.40. Thus, the repeatability of the method can be improved. Furthermore, the effluent can be adapted according to the needs of a cement producer, for the purpose for example of obtaining particular properties of the cement.

According to an example, the measurement of the molar ratio $SiO_2/M_2O$ is taken in an etching bath, during an etching method of the substrate based on silicon, by a piece of equipment for regulating the etching bath. The measurement of this ratio can thus be taken directly during the etching method, in particular in such a way as to identify if the etching bath is able to be provided for the manufacture of cement.

According to an example, the method of etching silicon comprising a plurality of successive etchings of silicon-based substrates in the etching bath, several measurements of the molar ratio $SiO_2/M_2O$ are taken during the plurality of successive etchings. Preferably, a measurement is taken at regular intervals during the plurality of successive etchings, and preferably between each etching. The measurement of this ratio can thus be taken directly during the unfolding of the etching method, in particular in such a way as to identify when the etching bath is able to be provided for the manufacture of cement.

According to an example, the modification of the at least one etching effluent comprises an adjustment of the relative molar concentrations between the silicate and the monovalent metal M.

According to an example, the modification of the at least one etching effluent comprises the combination of a plurality of separate etching effluents.

According to an example, the pH of the at least one etching effluent is greater than 9, and preferably greater than 12. Thus, the quantity of dissolved silica in the effluent can be maximised.

According to an example, the molar ratio $SiO_2/M_2O$ is, preferably, less than or equal to 3. Thus, the etching effluent has a lesser chemical risk at handling and transport.

According to an example, the aluminosilicate raw material is chosen from natural minerals such as kaolinite or clays, metallurgical slags, fly ash, silica fume, volcanic tuff and tailings.

According to an example, the aluminosilicate raw material comes from the discharge of an industrial method. As the aluminosilicate raw material and the etching effluent are waste from industrial methods that are upgraded in this method for manufacturing cement, the impact on the environment of the method is further reduced.

According to an example, the substrate based on silicon of which the etching effluent is provided, is a substrate made of crystalline silicon and more particularly of monocrystalline silicon. The silicon-based substrate forms or is intended for forming a photovoltaic cell for example a photovoltaic cell based on silicon, for example of technology of the homo-junction or heterojunction type or a microelectronic component.

It is specified that in the framework of the present invention, a parameter "substantially equal/greater/less than" a given value means that this parameter is equal/greater/less than a given value, by plus or minus 10%, even plus or minus 5%, of this value.

The term compound or material "based on" a material A, means a compound or material that contains this material A, and possible other materials.

An alkali metal generally designates a metal element from the first column of the periodic table of the chemical elements, preferably potassium K or sodium Na.

The molar ratio i/j between two compounds i and j designates the ratio of the quantity of material in moles of the compound i over the quantity of material in moles of the compound j.

The method 1 of manufacturing cement is now described according to an embodiment in reference to FIG. 1.

To manufacture cement, the method 1 comprises providing 10 a substrate etching effluent 2 based on or made of silicon, and in particular monocrystalline silicon. This effluent can come from any industry and/or any method comprising this etching.

For example, the effluent can come from a method of manufacturing photovoltaic cells based on silicon, or from a microelectronics method for treating a substrate based on silicon. When the effluent comes from a method for manufacturing photovoltaic cells, it comes in particular from:
- a step of etching of the substrate in silicon intended for removing the damaged zones of the substrates after cutting (step also known under the acronym SDE for "Saw Damage Etching"), and/or
- a step of texturing the surface of the substrate intended for the creating of the pyramids.

For a photovoltaic plant of 1 GW/year of production of photovoltaic cells based on silicon, it is estimated that the volume of etching effluent generated is between 3500 m$^3$ and 5000 m$^3$, comprising about 200 tonnes of dissolved alkali silicates. These effluents constitute chemical waste, upgradable via the reinjection thereof in the method 1 for the manufacture of cement. Thus the energy cost and the resources for manufacturing this cement are reduced. A cement of which the manufacture has a reduced environmental impact can be obtained.

During the etching of a silicon-based substrate, described in detail hereinafter, the substrate 2 is exposed to reagents of an etching bath 4, chosen to react with the silicon and thus shape the surface of the substrate. During a method 14 of etching, the silicon is typically silicon dioxide, having chemical formula $SiO_2$ then etched 140. The etching bath 4 is loaded with dissolved silica to form the etching effluent. Typically, the etching bath is loaded with dissolved silica as the etching 140 of a plurality of substrates 2 occurs, as shall be seen in what follows.

At the end of the etching 140 of these substrates 2, the effluent comprises at least one type, and for example several types of silicates of alkali metal M dissolved in solution. According to an example, the solution is at least partially aqueous, and preferably the solution is an aqueous solution of at least one dissolved silicate of alkali metal M. Undissolved alkali metal silica has the chemical formula $SiO_2$: $M_2O$. The alkali metal can vary according to the reagents used in the etching bath. The alkali metal M is preferably potassium (K) or sodium (Na). The alkali metal silica is therefore preferably a potassium silica, or a sodium silica.

In the etching bath 4, and therefore in the subsequent effluent, the alkali metal oxide $M_2O$ can be dissolved in alkali metal hydroxide, having formula MOH, according to the following chemical reaction: $M_2O + H_2O \rightarrow 2 M^+ + 2 OH^-$. The silica can be dissolved according to the following chemical reaction: $SiO_{2(s)} + 2H_2O \rightarrow Si(OH)_{4(aq)}$. According to the pH of the effluent, $Si(OH)_4$ is converted in one or the other of the species of conjugated acid/base pairs $H_3SiO_4^-$ and $H_2SiO_4^{2-}$. Generally, dissolved silica, or "total silica" designates all the species that comprise the element silicon, coming from the oxidation thereof in silica and the dissolution thereof in the etching bath. The measurement of species dissolved in solution makes it possible to find via equivalence the relative quantities of dissolved $SiO_2$ and $M_2O$ and therefore the molar ratio $SiO_2/M_2O$ in solution.

The etching effluent can be mixed 13 with an aluminosilicate raw material provided 12. During this mixing 13, the alkali metal silicate reacts with the aluminosilicate raw material to form the geopolymer cement. For this, the etching effluent has a molar ratio $SiO_2/M_2O$ greater than or equal to 0.8 and preferably greater than or equal to 1.40. These minimum values of the molar ratio make it possible to ensure the obtaining of a cement that has satisfactory mechanical properties. Even more preferably, the molar ratio $SiO_2/M_2O$ can be greater than or equal to 1.45. When the molar ratio $SiO_2/M_2O$ is greater than or equal to 1.45. The transport and the manipulation of the effluent are thus facilitated. In order to be assured of this value, and therefore of the quality and/or of the repeatability of the cement obtained, the method 1 can comprise a verification 11 of the molar ratio $SiO_2/M_2O$. This verification 11 can in particular be done to verify that this molar ratio $SiO_2/M_2O$ is greater than or equal to the aforementioned values. This verification 11 can be carried out prior to the mixing 13, and/or prior to providing 10 the etching effluent.

The value of the molar ratio $SiO_2/M_2O$ can be adapted 111 according to the nature of the aluminosilicate raw material. The molar ratio $SiO_2/M_2O$ can be preferably less than 4, preferable less than 3. Thus, the effluent is considered chemically as little dangerous for an operator. The transport of the effluent and the handling thereof in the method 1 are this facilitated. Furthermore, the effluent is then more stable, which facilitates the storage of the effluent.

According to the pH of the etching effluent, the quality of silica that can be dissolved in the effluent can be optimised. According to an example, the pH of the etching effluent is greater than or equal to 9. Thus, the molar concentration in silica can reach at least $10^{-3}$ mol/L. Preferably, the pH of the etching effluent is greater than or equal to 12. Thus, the molar concentration in silica can reach at least 0.5 mol/L. For example, for an etching effluent comprising potassium hydroxide diluted to a mass fraction of substantially 3.5% with respect to the total weight of the solution, the pH is substantially equal to 13.8 and the etching bath can comprise substantially several tens of mol/L of dissolved silica. According to an example, the content in dissolved silica in the effluent is comprised between 2 and 10 mol/L. The method 1 can comprise a measurement 110' of the pH of the etching effluent, and an adjustment 111 of the pH of the effluent to reach a determined pH value. The measurement 110' and/or the adjustment 111 can be carried out prior to the mixing 13, and/or prior to providing 10 the etching effluent. During the adjustment 111, the etching effluent can be buffered to prevent variations in pH that can cause a modification in the dissolution balances, and in particular a precipitation of the dissolved silica.

At least one aluminosilicate raw material can be provided 12 to manufacture the cement. Several aluminosilicate raw materials can be provided 12 and mixed 13 with the effluent, for example to modulate the properties of the cement obtained. The aluminosilicate raw material comprises silicates wherein silicon atoms are replaced with aluminium atoms. The aluminosilicate raw material can be chosen from natural minerals such as kaolinite or clays, or volcanic tuffs. The aluminosilicate raw material can come from an industrial method. Thus, the aluminosilicate raw material and the etching effluent can both come from industrial methods, of which the waste is therefore upgraded by the manufacture of cement according to the method 1. Concerning the aluminosilicate raw material, there is no additional extraction cost. The energy and the resources required for the manufacturing of the cement, as well as the $CO_2$ discharges, are further limited. The impact of the environment of the method 1 is further reduced.

For example, the aluminosilicate raw material can come from metallurgical dross, such as metallurgical slags, and more particularly blast furnace slag. According to an example, the aluminosilicate raw material is a blast furnace ground and granulated slag. The aluminosilicate raw material can be fly ash, generally resulting from the combustion of the anthracite or bituminous coal, or lignite or sub-bituminous coal. The aluminosilicate raw material can be silica fume, generally produced from the production of silicon by reduction in the quartz or from the production of ferro-silicon alloys. The aluminosilicate raw material can be the result of tailings.

During the mixing 13 of the aluminosilicate raw material with the etching effluent, the aluminosilicate raw material and the etching effluent can be mixed in variable proportions, in particular according to the nature of the aluminosilicate raw material and the properties sought for the cement. According to an example, the aluminosilicate raw material can represent at least 70% of the mixture 13. The etching effluent, possibly supplemented with water, can represent the rest of the mixture. According to an example wherein the aluminosilicate raw material is a blast furnace ground and granulated slag, the mixture 13 can comprise from 80 to 90% slag for 10 to 20% etching effluent.

In order to verify 11 the molar ratio $SiO_2/M_2O$ of the etching effluent, the method can comprise a measurement 110 of this ratio. The measurement 110 can comprise a measurement of the quantity of dissolved silica in the effluent, and of the equivalent quantity of $M_2O$ from the quantity of alkali metal hydroxide M dissolved in the effluent. This measurement can be taken prior to the mixing 13, and/or prior to providing 10 the etching effluent. This measurement can be taken on a sample in the etching effluent, or directly in the etching bath as shall be seen in what follows. These measurements can be taken by any means known to those skilled in the art. For example, the quantity of dissolved silica can be measured by a dosage of the total silica. Optical spectrum analysis techniques can furthermore be considered.

In order to adapt the value of the molar ratio $SiO_2/M_2O$ to a particular value, the method 1 can comprise a modification 111 of the etching effluent. This modification 111 can comprise an adjustment of the relative concentrations in $SiO_2$ and $K_2O$, for example via dilution, via concentration and/or adding one or more chemical species in the effluent. The adjustment is preferably done according to the measurement 110 taken. Alternatively or complementarily, the modification 111 of the etching effluent can comprise a combination of a plurality of effluents, preferably of which the molar ratio $SiO_2/M_2O$ was measured 110 beforehand. The management of the etching bath waste is thus optimised according to the chemical composition of the effluents, in order to obtain a particular value of the molar ratio $SiO_2/M_2O$. The cost and the environmental impact of the method are thus further minimised.

The silicon etching industrialist can verify 11 the molar ratio $SiO_2/M_2O$ and can modifier 111 the etching effluent according to the needs of a cement producer implementing the method 1. The etching effluent(s) can be provided to the cement producer. According to an example, the cement producer carries out, after reception, the verification 11 of the molar ratio $SiO_2/M_2O$. The cement producer can then modify 111 the etching effluent according to the specific needs for the manufacturing of a cement. These effluents can be provided from the silicon etching industrialist to a third party. The third party can then provide 10 the effluent(s) to the cement producer. Before providing 10 the effluent to the cement producer, the third party can carry out the verification 11, and can modify 111 the effluent. One or more of the three parties can provide the verification 11 and can modify 111 the etching effluent.

According to an example, a measurement 141 of the molar ratio $SiO_2/M_2O$ can be carried out by a silicon etching industrialist. Typically, during an etching method of silicon 14, the substrate 2 based on silicon is etched in an etching bath 4. This method is now described in reference to FIG. 2. During the method of etching 14, the damaged surfaces, commonly designated as work-hardened zone, resulting from the cutting of silicon wafers, is removed. This etching 140 of the surface of silicon wafers is commonly abbreviated as SDR, for "saw damaged removal", which is a removal of the work-hardened zone, or SDE, for "saw damaged etching", which is an etching of the work-hardened zone. This etching 140 is generally carried out in a bath of a basic solution of potassium hydroxide, having formula KOH, or sodium hydroxide, having formula NaOH.

After the removal of the work-hardened zone, the method 14 can include a second step of etching 140 in a bath of a basic solution of potassium hydroxide or sodium hydroxide, generally called texturing. The texturing is configured to former pyramids on the surface of the substrate via the principle of anisotropic etching, according to the orientation of the crystalline planes of the silicon. For the purposes of information, the SDR step represents about two-thirds of the mass of silicon removed on the substrates and the service life of an etching bath is often given for the treatment of about 60,000 substrates. The step of texturing represents about one-third of the mass of silicon removed on the substrates and the service life of the etching bath is about 20,000 to 30,000 substrates.

During a method 14 of etching silicon, each etching bath sees indeed the passing of a succession of batches of substrates 2. With each passage of a batch, a bath strategy is associated in order to supplement the etching bath. More particularly, potassium or sodium hydroxide and deionised and/or demineralised water are added between the passage of each batch. An adjustment of the volume of the bath is carried out so as to compensate on the one hand the liquid lost via transport of the substrates 2, the sufficient renewal of the chemical species responsible for the etching and the compensation in volume of the bath in order to retain a volume and a chemical composition that are sufficient for the etching 140 of the substrate 2.

Figure 2:
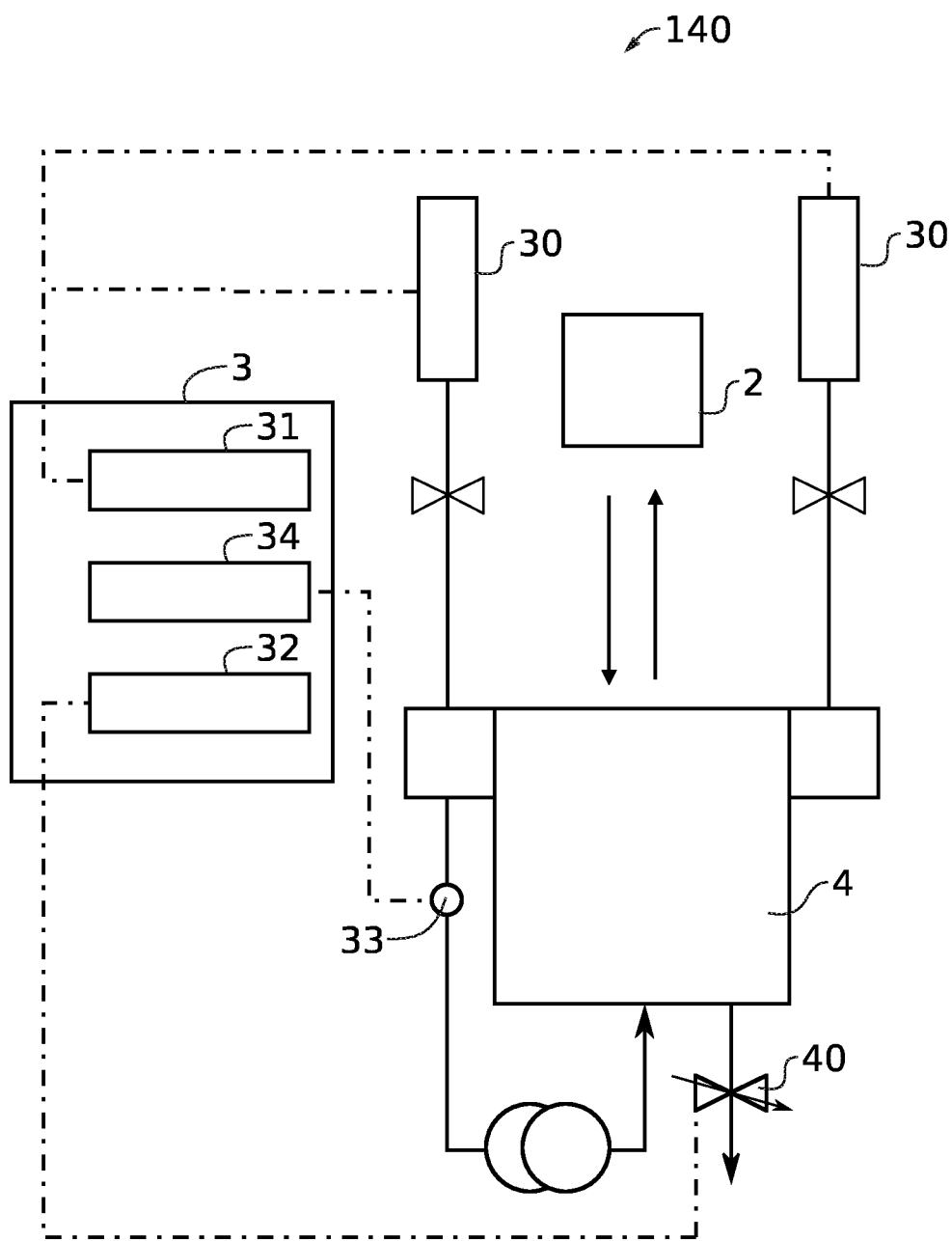
FIG. 2 shows an example of the etching of a substrate based on silicon, implementing a piece of equipment for regulating an etching bath.

Typically, as shown in FIG. 2, a portion of the etching bath 4 can be removed by a drain 40. Means for adding 30 water and/or reagents can then be actuated to supplement the etching bath 4. As the etchings occur, the etching bath 4 is enriched with dissolved silica. The molar ratio $SiO_2/M_2O$ can therefore change until the etching bath 4, and the etching resulting effluent, are able to be used in the method for manufacturing cement.

By way of example, several bath strategies and the impact thereof on the ratio $SiO_2/M_2O$ are described. These strategies correspond to a piece of industrial equipment of which the bath volume is 131 L so as to treat 200 silicon wafers per batch. According to a first strategy, 0.5 L of a solution of KOH at 45% in mass fraction can be added, with respect to the total weight of the solution of KOH, and 2 L of water between each batch. After the treatment of the 40th batch, a molar ratio of $SiO_2/K_2O$ greater than 1.4 can be obtained. The final etching effluent, after passage of all the batches, can thus have a molar ratio of $SiO_2/K_2O$ substantially equal to 1.7.

According to a second strategy, 0.3 L of a solution of KOH at 45% in mass fraction can be added, with respect to the total weight of the solution of KOH, and 2.5 L of water between each batch. After the treatment of the 40th batch, a molar ratio of $SiO_2/K_2O$ greater than 2 can be obtained. The final etching effluent, after passage of all the batches, can thus have a molar ratio of $SiO_2/K_2O$ substantially equal to 2.7.

According to a third strategy, 0.3 L of a solution of KOH at 45% in mass fraction can be added, with respect to the total weight of the solution of KOH, and 1 L of water between each batch. After the treatment of the 40th batch, a molar ratio of $SiO_2/K_2O$ greater than 2 can be obtained. The final etching effluent, after passage of all the batches, can thus have a molar ratio of $SiO_2/K_2O$ substantially equal to 2.5.

According to a fourth strategy, 1 L of a solution of KOH at 45% in mass fraction can be added, with respect to the total weight of the solution of KOH, and 3 L between each batch. After the treatment of the 25th batch, a molar ratio of $SiO_2/K_2O$ greater than 0.7 can be obtained. The final etching effluent, after passage of all the batches, can thus have a molar ratio of $SiO_2/K_2O$ substantially equal to 0.9.

According to an example, the method of etching silicon 140, and in particular the bath strategy, can be adapted to obtain a particular molar ratio $SiO_2/M_2O$.

The silicon etching industrialist can implement the verification 11 of the ratio $SiO_2/M_2O$ in the etching bath and/or in the effluent resulting therefrom. According to an example, the measurement 141 of the ratio $SiO_2/M_2O$ can be taken by measurement or sampling in the etching bath 4. The measurement 141 can be taken at regular intervals during the etching method 140, for example after a determined number of batches of substrates has been treated. According to the example shown in FIG. 2, the etching method 140 can implement a piece of equipment for regulating 3 the etching bath 4. This equipment comprises means for adding 30 reagents and/or water in the etching bath 4, actuated by one or more regulator(s) 31. The equipment for regulating 3 can comprise a sensor 33, that can be connected to a processing unit 34 of the value measured. The sensor 33 can be disposed in the etching bath 4. Preferably, and as shown in FIG. 2, the sensor 33 is disposed on a recirculation loop of the etching bath 4, allowing for an in-line measurement on a fraction of the etching bath 4.

Figure 3:
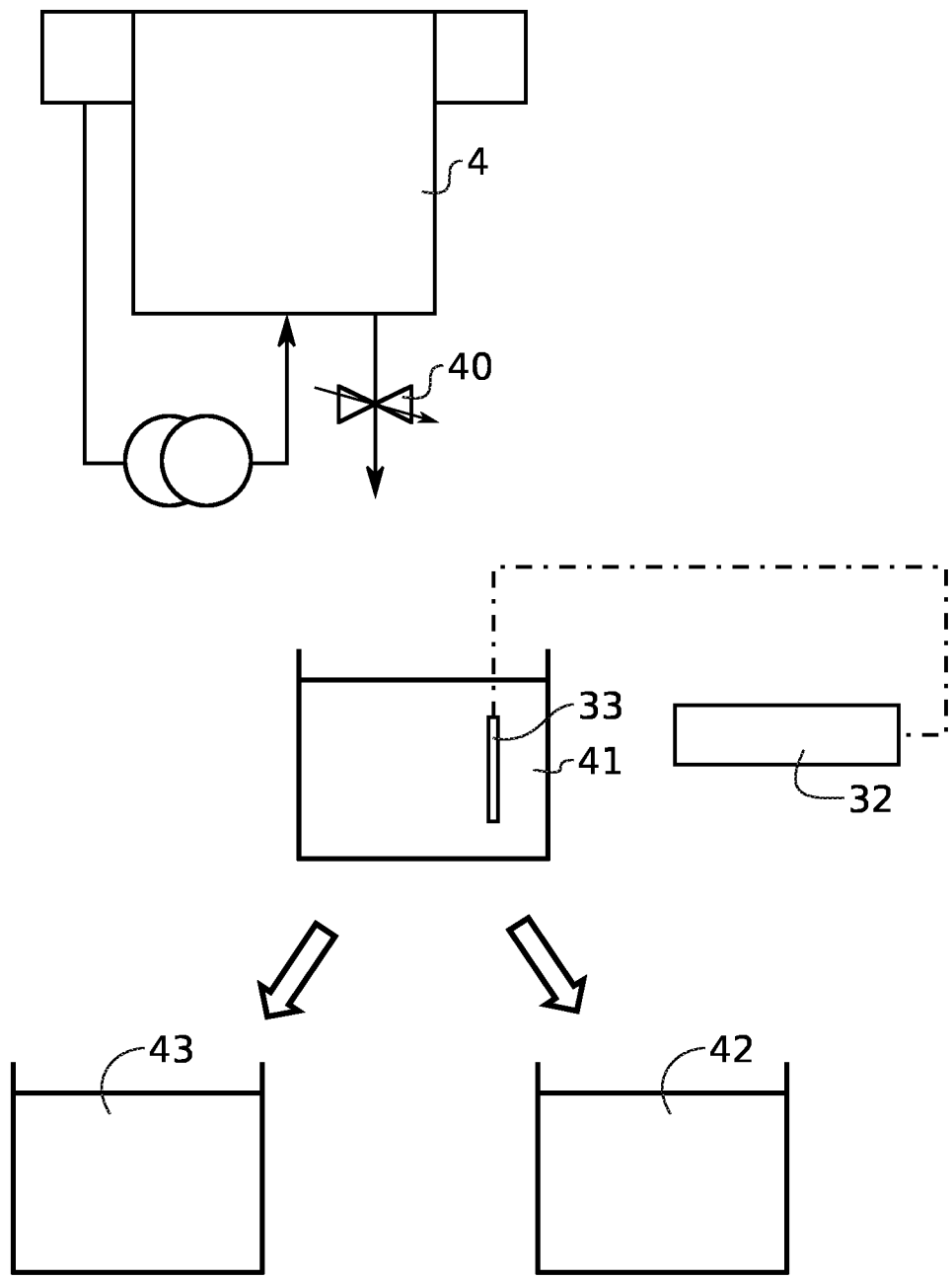
FIG. 3 shows an example of a measurement of the ratio $SiO_2$/$K_2O$.

Alternatively or complementarily, the measurement 141 of the ratio $SiO_2/M_2O$ can be taken by measurement or sampling in an effluent coming from an etching bath 4 at a recirculation loop of the etching bath 4, and/or after drainage as shown in FIG. 3. The measurement 141 can for example be taken thanks to a sensor 33, that can be connected to a processing unit 34 of the value measured. Following the measurement 141, different etching effluents can be distributed according to the molar ratio $SiO_2/M_2O$. The etching effluents can be separated in different tanks 42, 43, possibly for a subsequent modification 111.

The method 1 can further comprise, during or after the mixing 13 of the aluminosilicate raw material and of the etching effluent, a mixing of these elements with a separate cement, for example a Portland cement. The cement or the mixture of cements obtained at the end of the method 1 can be used for the manufacturing of a concrete, via in particular a mixing with aggregates.

In light of the preceding description, it clearly appears that the invention proposes a particularly advantageous solution for the upgrading of etching effluent and a method that makes it possible to reduce the environmental impact of a method for manufacturing cement from aluminosilicate raw material The invention is not limited to the embodiments described hereinabove and extends to all the embodiments covered by the claims.

The invention claimed is:

1. A method for manufacturing cement, the method comprising:
    mixing an aluminosilicate raw material with at least one etching effluent of a substrate comprising silicon comprising a silicate of a dissolved alkali metal M, and having a formula $SiO_2:M_2O$, with an $SiO_2/M_2O$ molar ratio greater than or equal to 0.8.

2. The method of claim 1, further comprising, prior to the mixing:
    verifying that the $SiO_2/M_2O$ molar ratio of the at least one etching effluent is greater than or equal to 0.8.

3. The method of claim 2, wherein the verifying comprises measuring the $SiO_2/M_2O$ molar ratio in the at least one etching effluent, and optionally modifying the at least one etching effluent in such a way that the $SiO_2/M_2O$ molar ratio reaches a determined value.

4. The method of claim 3, wherein the modifying of the at least one etching effluent comprises adjusting relative molar concentrations between the silicate and the alkali metal M, and/or a combination of a plurality of separate etching effluents.

5. The method of claim 1, further comprising, prior to mixing with the at least one etching effluent:
    measuring the $SiO_2/M_2O$ molar ratio in the at least one etching effluent, and optionally modifying the at least one etching effluent in such a way that the $SiO_2/M_2O$ molar ratio reaches a determined value.

6. The method of claim 5, wherein measuring the $SiO_2/M_2O$ molar ratio is taken in an etching bath, during an etching of the substrate, by an equipment suitable for regulating the etching bath.

7. The method of claim 6, wherein the etching of the silicon comprises a plurality of successive etchings of substrates based on silicon in the etching bath,
    wherein several measurements of the $SiO_2/M_2O$ molar ratio are taken during the plurality of successive etching.

8. The method of claim 1, wherein the at least one etching effluent has a pH greater than 9.

9. The method of claim 1, wherein the $SiO_2/M_2O$ molar ratio is greater than or equal to 0.8 and less than or equal to 3.

10. The method of claim 1, wherein the aluminosilicate raw material is a natural mineral, metallurgical slag, fly ash, silica fume, volcanic tuff, tailings, or a mixture of two or more of any of these.

11. The method of claim 1, wherein the substrate is based on silicon suitable for forming a photovoltaic cell.

12. The method of claim 1, wherein the substrate is based B on silicon suitable for forming a microelectronic component.

13. The method of claim 1, wherein the $SiO_2/M_2O$ molar ratio greater than or equal to 1.40.

14. The method of claim 13, further comprising, prior to the mixing:
    verifying that the $SiO_2/M_2O$ molar ratio the at least one etching effluent is greater than or equal to 1.40.

15. The method of claim 1, wherein the aluminosilicate raw material comprises kaolinite and/or clay.

16. A method of manufacturing cement, the method comprising: combining a geopolymer cement raw material and an etching effluent of a substrate comprising silicon, formed from a silicate solution of a monovalent metal, having a formula $SiO_2:M_2O$, and having an $SiO_2/M_2O$ molar ratio greater than or equal to 0.8.

17. The method of claim 16, wherein the substrate is based on silicon suitable for forming a photovoltaic cell or a microelectronic component.

\* \* \* \* \*